United States Patent Office 3,499,948
Patented Mar. 10, 1970

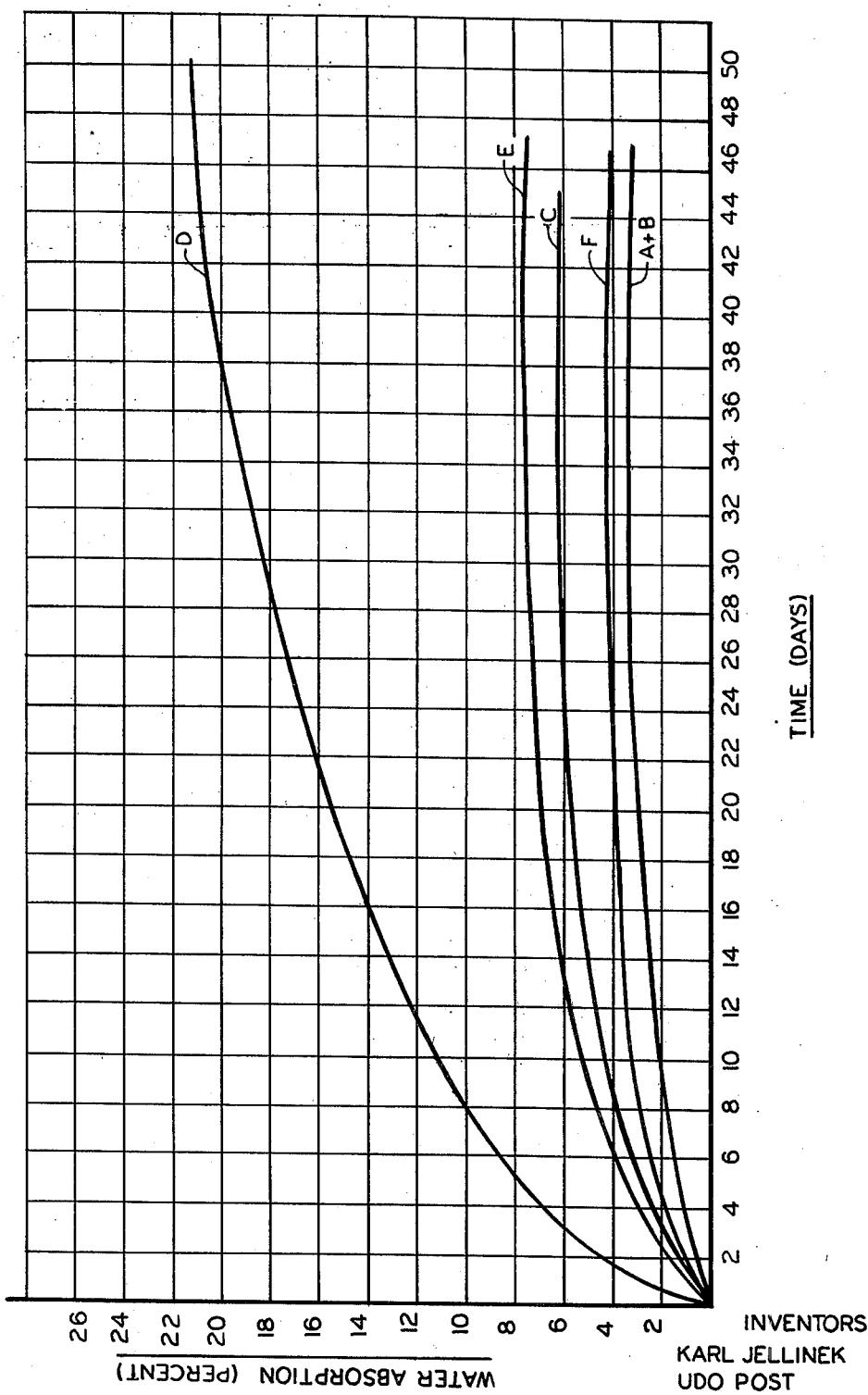

3,499,948
COATING MATERIALS FROM POLYEPOXIDES, DIGLYCIDYL ETHERS OF DIHYDROXYPOLY-URETHANES AND AN EPOXY CURING AGENT
Karl Jellinek, Duisburg-Meiderich, and Udo Post, Angermund, Germany, assignors to Rutgerswerke und Teerverwertung Aktiengesellschaft, Frankfurt am Main, Germany
Filed Feb. 21, 1967, Ser. No. 617,667
Claims priority, application Germany, Feb. 25, 1966, R 42,684
Int. Cl. C08g 45/12, 45/08, 45/10
U.S. Cl. 260—830
2 Claims

ABSTRACT OF THE DISCLOSURE

Elastic molded articles and coatings exhibiting very low absorption of water are prepared by reacting 70 parts by weight of a diglycidylether of an $\alpha,\omega$-dihydroxypolyurethane and 30 parts by weight of a diglycidylether of bis(4-hydroxyphenyl)-dimethylmethane, and 11 parts by weight of N-amino-ethylpiperazine at ordinary room temperature for 24 hours and subsequent after-annealing, and molding or applying the resulting products. The molded products and the coatings thus prepared are particularly useful in the electro-industry as well as in the art of building and in model and tool construction.

---

This invention relates to a process for producing molded articles or coatings from polyadducts based on epoxide compounds. These products are distinguished by high elasticity and a low adsorption of humidity which is quite unusual in materials of this type. The production of these materials is carried out with the application of epoxide compounds, diglycidylether derivatives of $\alpha,\omega$-dihydroxypolyurethanes which are prepared by the reaction of diisocyanates with an excess of polyetheralcohols, and known curing agents for epoxide resin.

Epoxide compounds yield in general with the known amine-like or anhydrous polyadduct-formers molded articles which are little elastic and extensible. It has been known to modify these disadvantageous properties by modification of the epoxide compounds—i.e. by addition of softeners, or by particular selection of polyadduct-formers in such manner that improvements are attained. Optimum results of these attempts consist in the reduction of the modulus of elasticity of the finished polyadducts to 20,000–25,000 and an increase of the extensibility of these materials by 35–40%, while the mechanical characteristics remain satisfactory.

Conventional softeners, by which these advantages can be attained, are, for example, ester of phthalic acid, adipic acid or sebacic acid as non-reactive plasticizing agents. Furthermore, as reactive plasticizers, substances of long chain, which are obtainable by epoxidation of polyetheralcohols of predetermined chain length can also be used. Said plasticizers are added to conventional epoxide-compounds, e.g. to diglycidylether of diphenylolpropane in an amount of 10–50% by weight.

It has been found that an improvement which by far exceeds the improvement obtainable according to the state of prior art, is attained by the use of diisocyanates as a reaction component for preparing flexibilizing reactive plasticizers for polyadducts from epoxide compounds. Thereby diisocyanates were reacted with an excess of polyetheralcohols of varying molecular weight and the resulting $\alpha,\omega$-dihydroxypolyurethanes were converted with epichlorhydrin, in a manner known per se, into the corresponding diglycidylethers with the use of Friedel-Crafts catalysts.

Molded articles which have been prepared with the use of such reactive plasticizers, as an addition to known epoxide compounds in the reaction with amine-like or anhydrous polyadduct formers, exhibit an unusual mechanical behavior which has not been observed previously. They have shown outstanding values of resistance to impact or shock and of impact strength in the notched-bar test in combination with outstanding values for expansibility. They have been found to be extraordinarily resistant to changes of thermal stress, without occurrence of the dreaded formation of cracks.

However, a disadvantage of the above described materials is their high water absorption which prevents their use in the production of flexible insulating materials for the electrical industry.

The main object of the present invention is therefore to provide a process for producing elastic materials or coatings by the formation of polyadducts from epoxide compounds, diglycidylether-derivatives of $\alpha,\omega$-dihydroxypolyurethanes, and known polyadduct-formers for epoxide compounds, the resulting polyadducts exhibiting—in contrast to known polyadducts—only very low absorption of humidity or water.

According to the present invention this is attained by using as the diglycidyl-derivatives of $\alpha,\omega$-dihydroxypolyurethanes compounds prepared from diisocyanates and an excess of polyetheralcohols of the general formula

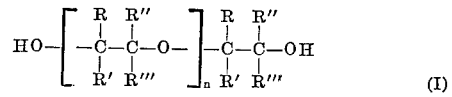

wherein R, R', R" and R"' stand for H atoms, alkyl-, cycloalkyl, alkylene, aralkyl- and/or aryl radicals said diglycidyl ether derivative having been formed by the reaction of epihalohydrin with dihydroxypolyurethane, $n$ is an integer having the value 1–10 and in which the $\alpha$ as well as the $\alpha'$ position relative to each ether-oxygen atom, within the polyethyleneglycol-chain is in each case occupied by at least one substituent different from the H-atom—and selected from the group consisting of alkyl-, cycloalkyl-, alkylene, aralkyl- or aryl radicals.

If diisocyanates are reacted with polyetheralcohols, according to the present invention and the resulting $\alpha,\omega$-dihydroxypolyurethanes—according to a known procedure—are converted with epichlorhydrin with said dihydroxy polyurethane, in the presence of Friedel-Crafts-catalysts into the corresponding diglycidylether derivatives, the latter yield, in reaction with epoxide compounds known per se—for example with the diglycidylether of diphenylolpropane and with known curing agents which are preferably amine-like or anhydrous, flexible molded articles or coatings, which exhibit an unexpectedly low absorption of water, are formed.

The very low absorption of water of molded articles or coatings obtainable by the invention is particularly surprising, because substitution with a substituent other than H, of only one $\alpha$-position—i.e., not the $\alpha'$-position—relative to each ether-oxygen atom, within the polyethyleneglycol-chain in the polyetheralcohols of the invention, results in products which exhibit substantially equal high values of water-absorption, as products prepared with the use of unsubstituted polyetheralcohols, e.g., polyethyleneglycol.

As substituents to be used in the $\alpha$- and $\alpha'$-position according to the invention, for example the following can be used: The methyl-, ethyl-, propyl-, cyclohexyl-, vinyl-, benzyl-, phenyl- or naphthyl-radicals.

As examples of the known epoxide compounds which are reacted according to the invention with diglycidyl-derivatives of the $\alpha,\omega$-dihydroxypolyurethanes and with known polyadduct-formers, the following are mentioned: Conversion products prepared according to known processes from diphenols and polyphenols—such as resorcin and hydroquinone; 4,4'-dihydroxydiphenylmethane; 4,4'-dihydroxydiphenylpropane, condensation products of the novolak-type of phenol with formaldehyde, or reaction products of phenols with $\alpha,\beta$-unsaturated aldehydes, such as crotonaldehyde or acrolein, with epichlorhydrin and dichlorhydrins, which are prepared in the presence of stoichiometric amounts of alkali hydroxide. Other examples of epoxide compounds which can be used according to the invention, are diene compounds epoxidized with peracids and glycidyl compounds of polyalcohols.

The proportion between the known epoxide compound and the diglycidyl-ether-derivative of an $\alpha,\omega$-dihydroxypolyurethane in the reaction with known polyadduct-formers, according to the invention amounts to 95:5 to 5:95, preferably 50:50 to 30:70.

As polyadduct-formers for the mixtures according to the invention, aliphatic, cycloaliphatic or aromatic amines and polyamines, as well as heterocyclic amines of the type of piperazine, morpholines or imidazoles, carboxylic acid anhydrides, Friedel-Crafts catalysts, phenol-, melamine-, urea- and dicyan-diamide-formaldehyde resins can be used, with or without the addition of basic or acid accelerators.

Due to their water repellent behavior, the molded articles and coatings prepared according to this invention are highly useful in the electro-industry, art of building and construction, model construction, and tool construction.

The product of the diglycidyl-ethers of $\alpha,\omega$-dihydroxypolyurethanes is not sought to be protected in this application.

In the following, the invention is further illustrated by working examples, a table of comparative values and the diagram.

EXAMPLE 1

(a) Preparation of diglycidylether of an $\alpha,\omega$-dihydroxypolyurethane

To 400 g. of a poly-1,2-dimethylethyleneglycol (average mol-weight 200) slowly and with cooling 168 g. of hexamethylenediisocyanate are dropwise added and the resulting mixture is subsequently heated to 100° C. for one hour. After addition of 1 ml. of borontrifluoride-etherate of 30% concentration at 60° C., slowly 200 g. of epichlorhydrin are added dropwise and subsequently 176 g. of aqueous NaOH solution of 50% are added at 40° C. The diglycidylether of an $\alpha,\omega$-dihydroxypolyurethane is thus obtained as a product of medium viscosity.

The yield amounts to 90–95%.
Epoxide equivalent: 860.
Viscosity at 25° C.: about 6000 centipoise.

(b) Preparation of material according to the invention 70 parts by weight of the above described diglycidyl-ether of an $\alpha,\omega$-dihydroxypolyurethane and 30 parts by weight of a diglycidylether of bis(4-hydroxyphenyl)-dimethylmethane are reacted with 11 parts by weight of N-aminoethylpiperazine at ordinary room temperature of about 18° C. After 24 hours, the material is subjected to after-annealing at 100° C. for 2 hours. Characteristics of the material—

Tensile strength: 130 kp./cm.$^2$
Modulus of elasticity (tensile test) 1200 kp./cm.$^2$
Expansibility: 110%
Impact resistance in notched bar test: 96 cm. kp./cm.$^2$
Water absorption: 1.1%

EXAMPLE 2

A mixture consisting of 65 parts by weight of the diglycidyl ether of an $\alpha,\omega$-dihydroxypolyurethane, according to Example 1, 35 parts by weight of a diglycidylether of bis(4-hydroxyphenyl)-dimethylmethane and 40 parts by weight of methylendomethylene-tetrahydrophthalic acid anhydride is treated at 100° C. for one hour and subsequently kept at 120° C. for 10 hours.

A material having the following characteristics results.

Tensile strength: 400 kp./cm.$^2$
Expansibility: 35%
Impact strength: 85 cm. kp./cm.$^2$
Impact resistance in notched bar test: 30 cm. kp./cm.$^2$
Water absorption: 0.5%

EXAMPLE 3

(a) Preparation of the diglycidyl-ether of an $\alpha,\omega$-dihydroxy-polyurethane To 600 g. of a poly-1-methyl-2-ethylethyleneglycol (average molecular weight 300) slowly and with cooling 168 g. of hexamethylenediisocyanate are dropwise added. The mixture is subsequently heated to 100° C. for one hour. After the addition of 1 ml. borontrifluoride-etherate of 30% concentration, at 60° C. 200 g. of epichlorhydrin are dropwise added and then 176 g. of aqueous NaOH solution of 50% are added at 40–45° C. The diglycidyl-ether of an $\alpha,\omega$-dihydroxypolyurethane having the following characteristics is thus obtained.

Yield: 90–95%
Epoxide equivalent: 720
Viscosity at 25° C.: 4100 centipoise (b) Preparation of a material according to the invention 70 parts by weight of the diglycidyl ether, prepared as above described, or an $\alpha,\omega$-dihydroxypolyurethane and 30 parts by weight of a diglycidyl ether of bis(4-hydroxyphenyl)-dimethylmethane, are reacted with 10 parts by weight of N-amino-ethyl-piperazine at ordinary room temperature and after 24 hours are subjected to after tempering at 100° C. for 2 hours.

Characteristics of the resulting material:

Tensile strength: 150 kp./cm.$^2$
Modulus of elasticity: 3200 kp./cm.$^2$
Expansibility: 125%
Impact resistance in notched bar test: 45 cm. kp./cm.$^2$
Water absorption: 0.7%

In the following table the mechanical characteristics and the water absorption values (after immersion in water for one day) of the following materials are listed. All materials were produced with N - amino-ethylpiperazine as the polyadduct former.

MATERIALS (A) Prepared from a diglyciylether of bis-(4-hydroxyphenyl)-dimethylmethane unmodified;
(B) Same as (A), but modified with non-reactive plasticizer;
(C) Same as (A), but modified with polyglycol-diglycidylether;
(D) Same as (A), but modified with polyurethane-plasticizer with the use of polyethyleneglycol;
(E) Same as (A) with polyurethane-plasticizer with the use of a polyether alcohol according to the invention;
(F) Same as (A) but modified with a polyurethane-plasticizer according to Example 3.

| | A | B | C | D | E | F |
|---|---|---|---|---|---|---|
| Tensile strength, kp./cm.², DIN 53455 | 550 | 380 | 140 | 126 | 130 | 150 |
| Modulus of elasticity, kp./cm.², DIN 7705 | 32,500 | 16,800 | 1,700 | 170 | 1,200 | 3,200 |
| Expansibility, percent, DIN 53455 | 21 | 27 | 56 | 105 | 110 | 125 |
| Impact strength, cm.kp./cm.², DIN 53453 | 27 | 31 | | | | |
| Impact strength (notched test), cm.kp./cm.², DIN 53453 | 3 | 4 | 16 | 105 | 96 | 45 |
| Water absorption, percent, DIN 53475 | 0.2–0.3 | 0.4–0.5 | 1.0 | 2.8 | 1.1 | 0.7 |

The diagram of the drawings shows the course of water absorption of the materials denoted above A to F during storage in water up to 50 days.

It will be appreciated that the products prepared according to the present invention may be molded articles or coatings. In reacting the diisocyanates with an excess of polyetheralcohols, the latter are used in an excess of 1.05 to 2.5 mols polyetheralcohol per 1 mol diisocyanate. In the reaction between α,ω-dihydroxyurethanes with epichlorhydrin, for example $BF_3$ etherate, $BF_3$ phenolate, $AlCl_3$, $SnCl_4$, and the like, can be used as Friedel-Crafts catalysts. As examples for the substituents symbolized in Formula I by R, R', R'' and R''', the following are mentioned: the methyl-, ethyl-, propyl-, cyclohexyl-, vinyl-, benzyl-, phenyl- or naphthyl-radicals. An example of diene compounds epoxidized with a peracid is vinylcyclohexanedioxide or dicyclopentadienedioxide, and as a further example of a glycidyl derivative of polyalcohol, ethyleneglycoldiglycidylether or glycerintriglycidylether is mentioned. The proportion by weight of a known epoxide compound, e.g. diglycidylether of bis(4-hydroxyphenyl)-dimethylmethane, to the diglycidylether of an α,ω-dihydroxypolyurethane in the reaction according to the invention may be preferably 30:70 as in Example 1(b) or 35:65 as in Example 2. The abbreviation "kp." stands for kiloponds and the abbreviation DIN for "Deutsche Industrie-Norm."

In the preparation of the materials A, B, C, D, E mentioned above the following starting materials and modifying agents were used:

(A) Diglycidylether of bis(4 - hydroxyphenyl) - dimethyl-methane having an epoxide equivalent of 190;
(B) As non-reactive plasticizer, dibutylphthalate;
(C) Polyglycol-diglycidylether (average mol - weight 600);
(D) Polyurethane plasticizer prepared from hexamethylenediisocyanate and polyethyleneglycol (average mol-weight 600):
(E) According to Example 1.

The parts and percents stated herein are by weight if not otherwise stated.

What is claimed is:

1. A process for producing elastic molded articles and coatings with low absorption of water by polyadduct formation from an epoxide compound having more than one 1,2-epoxide group per molecule and selected from the group consisting of polyglycidyl ethers of polyhydric phenols, epoxidized novolacs, and epoxidized dienes, in mixture with diglycidylether derivatives of α,ω-dihydroxypolyurethanes produced by reaction of diisocyanates with an excess of polyethers and curing agents for epoxide resins, comprising using as diglycidylether-derivatives of α,ω-dihydroxypolyurethanes being prepared from diisocyanates and an excess of polyetheralcohols of the structural formula

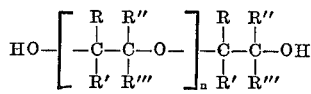

in which R, R', R'' and R''' are selected from the group consisting of H, alkyl, cycloalkyl, alkylene, aralkyl and aryl radicals, said diglycidyl ether derivative having been formed by the reaction of epihalohydrin with said dihydroxypolyurethane, n stands for an integer of the series 1–10 and in which the α-positions as well as the α'-positions to each etheroxygen atom within the polyethyleneglycol chain are occupied with a substituent other than H and selected from the group consisting of alkyl, cycloalkyl, alkylene, aralkyl and aryl radicals; the proportion of the polyetheralcohol and the diisoycanate being 1.5–2.5 mols per 1 mol and the proportion of known epoxide compounds to diglycidylether derivative being in the range of 50:50 to 30:70.

2. Elastic materials and coatings having low absorption of water formed by polyadduct formation from an epoxide compound having more than one 1,2-epoxide group per molecule and selected from the group consisting of polyglycidyl ethers of polyhydric phenols, epoxidized novolacs, and epoxidized dienes in mixture with diglycidylether derivatives of α,ω-dihydroxypolyurethanes produced by reaction of diisoycanates with an excess of polyetheralcohols and curing agents for epoxide resins, said diglycidylether derivatives of α,ω-dihydroxypolyurethanes being prepared from diisocyanates and an excess of polyetheralcohols of the structural formula

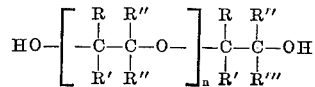

in which R, R', R'' and R''' are selected from the group consisting of H, alkyl, cycloalkyl, alkylene, aralklyl and aryl radicals said diglycidyl ether derivative having been formed by the reaction of epihalohydrin with said dihydroxypolyurethane, n stands for an integer for the series 1–10 and in which the α-positions as well as the α'-positions to each ether-oxygen atom within the polyethylene glycol chain are occupied with a substituent other than H and selected from the group consisting of alkyl, cycloalkyl, alkylene, aralkyl and aryl radicals; the proportion of the polyetheralcohol and the diisocyanate being 1.5–2.5 mols per 1 mol and the proportion of known epoxide compounds to diglycidylether derivative is in the range of 50:50 to 30:70.

References Cited

UNITED STATES PATENTS

| 2,830,038 | 4/1958 | Pattison | 260—830 |
| 3,239,580 | 3/1966 | Pendleton | 260—830 |
| 3,316,323 | 4/1967 | Wille | 260—830 |

MURRAY TILLMAN, Primary Examiner

P. LIEBERMAN, Assistant Examiner

U.S. Cl. X.R.

260—47, 54, 57, 59, 77.5, 831, 834